United States Patent
Dewan et al.

(10) Patent No.: US 9,519,803 B2
(45) Date of Patent: Dec. 13, 2016

(54) SECURE ENVIRONMENT FOR GRAPHICS PROCESSING UNITS

(71) Applicant: Intel Corporation, Santa Clara, CA (US)

(72) Inventors: Prashant Dewan, Hillsboro, OR (US); Uday R. Savagaonkar, Portland, OR (US); David M. Durham, Beaverton, OR (US); Paul S. Schmitz, North Plains, OR (US); Jason Martin, Beaverton, OR (US); Michael Goldsmith, Lake Oswego, OR (US); Ravi L. Sahita, Portland, OR (US); Francis X. McKeen, Portland, OR (US); Carlos Rozas, Portland, OR (US); Balaji Vembu, Folsom, CA (US); Scott Janus, Rocklin, CA (US); Geoffrey S. Strongin, Beaverton, OR (US); Xiaozhu Kang, Fremont, CA (US); Karanvir S. Grewal, Hillsboro, OR (US); Siddhartha Chhabra, Hillsboro, OR (US); Alpha T. Narendra Trivedi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 13/690,401

(22) Filed: Nov. 30, 2012

(65) Prior Publication Data
US 2014/0157410 A1  Jun. 5, 2014

(51) Int. Cl.
*G06F 21/00* (2013.01)
*G06F 21/64* (2013.01)
(Continued)

(52) U.S. Cl.
CPC ............. *G06F 21/64* (2013.01); *G06F 21/53* (2013.01); *G06F 21/56* (2013.01)

(58) Field of Classification Search
None
See application file for complete search history.

(56) References Cited

U.S. PATENT DOCUMENTS

| 6,631,354 B1* | 10/2003 | Leymann | G06Q 10/10 |
| | | | 705/7.26 |
| 7,712,143 B2* | 5/2010 | Comlekoglu | G06F 21/53 |
| | | | 713/181 |

(Continued)

FOREIGN PATENT DOCUMENTS

| EP | 2302861 | 3/2011 | |
| KR | 10-2012-0099472 | 9/2012 | |
| WO | WO 2011078855 A1 * | 6/2011 | ............. G06F 21/24 |

OTHER PUBLICATIONS

PCT International Search Report and Written Opinion issued in corresponding PCT/US2013/048036 dated Nov. 8, 2013, (12 pages).

*Primary Examiner* — Farid Homayounmehr
*Assistant Examiner* — Maung Lwin
(74) *Attorney, Agent, or Firm* — Trop Pruner & Hu, P.C.

(57) ABSTRACT

In accordance with some embodiments, a protected execution environment may be defined for a graphics processing unit. This framework not only protects the workloads from malware running on the graphics processing unit but also protects those workloads from malware running on the central processing unit. In addition, the trust framework may facilitate proof of secure execution by measuring the code and data structures used to execute the workload. If a part of the trusted computing base of this framework or protected execution environment is compromised, that part can be (Continued)

patched remotely and the patching can be proven remotely throughout attestation in some embodiments.

26 Claims, 5 Drawing Sheets

(51) Int. Cl.
*G06F 21/53* (2013.01)
*G06F 21/56* (2013.01)

(56) References Cited

U.S. PATENT DOCUMENTS

| | | | | |
|---|---|---|---|---|
| 8,037,530 | B1* | 10/2011 | Fink | H04L 9/0841 713/153 |
| 2003/0233538 | A1* | 12/2003 | Dutertre | H04L 63/104 713/151 |
| 2005/0108546 | A1* | 5/2005 | Lehew | H04L 63/06 713/182 |
| 2005/0120215 | A1* | 6/2005 | Lehew | H04L 63/061 713/171 |
| 2006/0015512 | A1* | 1/2006 | Alon | H04L 47/10 |
| 2007/0033389 | A1* | 2/2007 | Shamia | G06F 9/4405 713/2 |
| 2007/0234412 | A1* | 10/2007 | Smith | G06F 21/53 726/11 |
| 2008/0077994 | A1* | 3/2008 | Comlekoglu | 726/27 |
| 2008/0307488 | A1* | 12/2008 | Hammond et al. | 726/1 |
| 2009/0063665 | A1* | 3/2009 | Bagepalli | H04L 63/166 709/222 |
| 2009/0319787 | A1* | 12/2009 | Price | H04L 63/105 713/166 |
| 2010/0031342 | A1 | 2/2010 | Vogsland | |
| 2010/0031370 | A1* | 2/2010 | Ellison et al. | 726/27 |
| 2010/0064352 | A1* | 3/2010 | Holden | G06F 21/31 726/4 |
| 2011/0072433 | A1* | 3/2011 | Laviolette | G06F 9/5027 718/102 |
| 2011/0239211 | A1* | 9/2011 | Kim et al. | 717/178 |
| 2011/0314468 | A1* | 12/2011 | Zhou | G06F 9/45558 718/1 |
| 2011/0314469 | A1* | 12/2011 | Qian | H04L 49/9057 718/1 |
| 2012/0039336 | A1* | 2/2012 | Richmond | G06F 9/545 370/392 |
| 2012/0159184 | A1 | 6/2012 | Johnson | |
| 2012/0163589 | A1* | 6/2012 | Johnson et al. | 380/30 |
| 2012/0216242 | A1* | 8/2012 | Uner | H04L 9/3234 726/1 |
| 2012/0331135 | A1* | 12/2012 | Alon | H04L 41/044 709/224 |
| 2013/0298236 | A1* | 11/2013 | Smith | H04L 63/1491 726/23 |

* cited by examiner

SECURE ENVIRONMENT FOR GRAPHICS PROCESSING UNITS

BACKGROUND

This relates generally to processing graphics sometimes called graphics processors or graphics processing units.

Processing graphics are increasingly being exposed to workloads which require some degree of security. Security sensitive workloads on processing graphics have relied on the operating system to provide the necessary security. However, the increasing number of malware attacks suggest that these solutions are not meeting the security requirements for a number of workloads.

Examples of workloads that may need trust computation frameworks on graphics processing units include bank transactions where a browser offloads part of a transaction to a graphics engine, antivirus engines where part of the pattern matching is offloaded to graphics engine, and medical imaging. In addition many non-security workloads need added security, such as computer aided design, and graphical and other workloads that need unhampered execution in the presence of malware. In addition, security sensitive workloads are being offloaded to processing graphics due to the power, efficiency and performance improvements achieved by graphics processors. Examples may include cryptographic functions, pattern matching primitives, and face detection algorithms as well as certain workloads for mining, oil refineries, financial calculations and other calculations involving money.

Security sensitive workloads may need a trust framework on processing graphics that not only enforces the correctness of execution of the workload but also enables strict access control of the graphics assets to only authorized entities.

BRIEF DESCRIPTION OF THE DRAWINGS

Some embodiments are described with respect to the following figures.

DETAILED DESCRIPTION

In accordance with some embodiments, a protected execution environment may be defined for processing graphics. This framework not only protects the workloads from malware running on the graphics processing unit but also protects those workloads from malware running on the central processing unit. In addition, the trust framework may facilitate proof of secure execution by measuring the code and data structures used to execute the workload. If a part of the trusted computing base of this framework or protected execution environment is compromised, that part can be patched remotely and the patching can be proven remotely throughout attestation in some embodiments.

Figure 1:
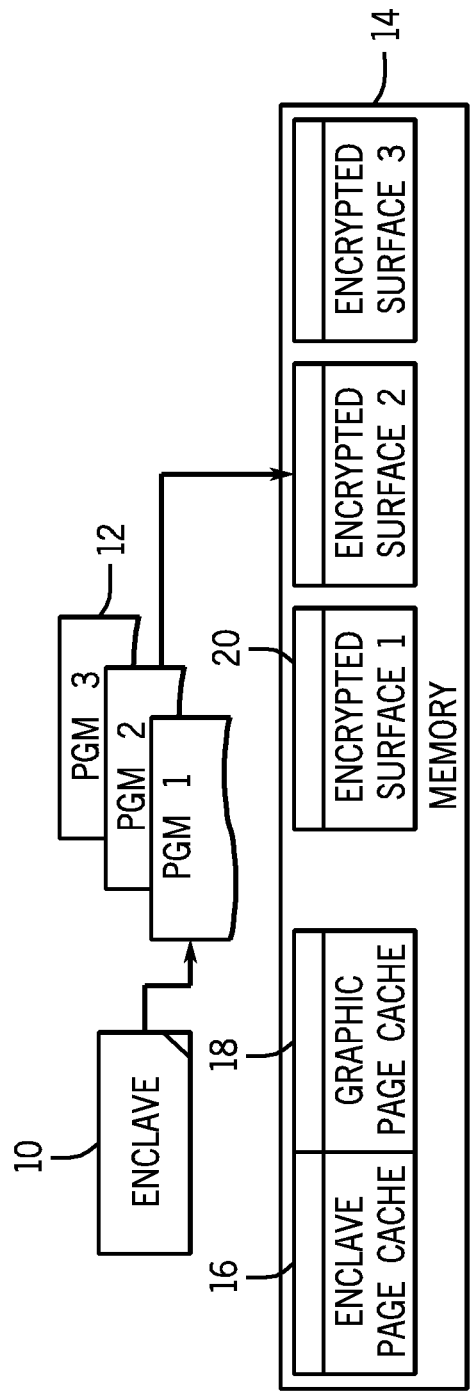
FIG. 1 is a pictorial diagram of one embodiment of the present invention.

Referring to FIG. 1, protected graphics modules, resident on processing graphics, contain code, data, and states needed for correct execution of a workload in the processing graphics. Similar to non-secure graphics workloads, the protected graphics module is created by software running on the central processing unit (CPU) by special CPU instructions. However, the protected graphics module can only be executed on the graphics processing unit in some embodiments. It may have the ability to assert correctness of execution to remote parties. In one embodiment, the module relies on the Secure Enclaves infrastructure to provide this assertion. See Patent Cooperation Treaty published application number WO/2010/057065, published on 20 May 2010.

In Secure Enclaves, a protected execution environment is built inside an application. An operating system constructs an enclave using a set of privileged instructions. Once the enclave is constructed, the application can enter and exit the enclave using a set of unprivileged instructions. An enclave executes in a physically protected area of memory called the enclave page cache. The hardware ensures that memory pages belonging to the enclave page cache can only be accessed by the enclave that owns those pages, and also ensures that malicious privileged software cannot redirect memory accesses originating from an enclave in an unexpected fashion. Software executing inside an enclave can prove that the enclave was constructed correctly by the operating system via hardware based attestation.

The graphics page cache 18 in the memory 14 holds code and data used by the protected graphics modules (PGMs) 12. In one embodiment this section of memory is implemented in the system dynamic random access memory (DRAM) and is cryptographically protected by a memory encryption engine. In yet another embodiment, this section of memory is implemented inside the processor package as static random access memory (SRAM) or embedded DRAM (eDRAM). This section of memory may be managed by the operating system graphics driver using a set of privileged CPU instructions. It may not be accessible to either of them for purposes of read or write or execute. The modules 12 reside inside the graphics page cache 18. In one embodiment, the graphics page cache may be combined with an enclave page cache 16.

The enclave 10 is responsible for creating and initializing the modules 12. Once a module is created and initialized by the enclave 10, various hardware engines on the processing graphics can enter the module 12 using specific entry points. Additionally, after module initiation, the enclave itself can carry out portions of the secure computation, and can communicate with the module via the graphics page cache 18. In this regard, the enclave 10 is the central processing unit (CPU) 24 counterpart of the modules 12 and it can have a one-to-many relationship with the modules 12.

The enclave 10 and modules 12 are both optional embodiments from the perspective of a developer. The application developer may decide whether an application needs a level of security provided by the combination of enclave and protected graphics module 12 in some embodiments.

Thus, within the memory, may be an enclave page cache 16, graphics page cache 18 including the modules 12 and the enclave 10 and one or more encrypted surfaces 20 to hold necessary data and/or instructions.

Figure 2:
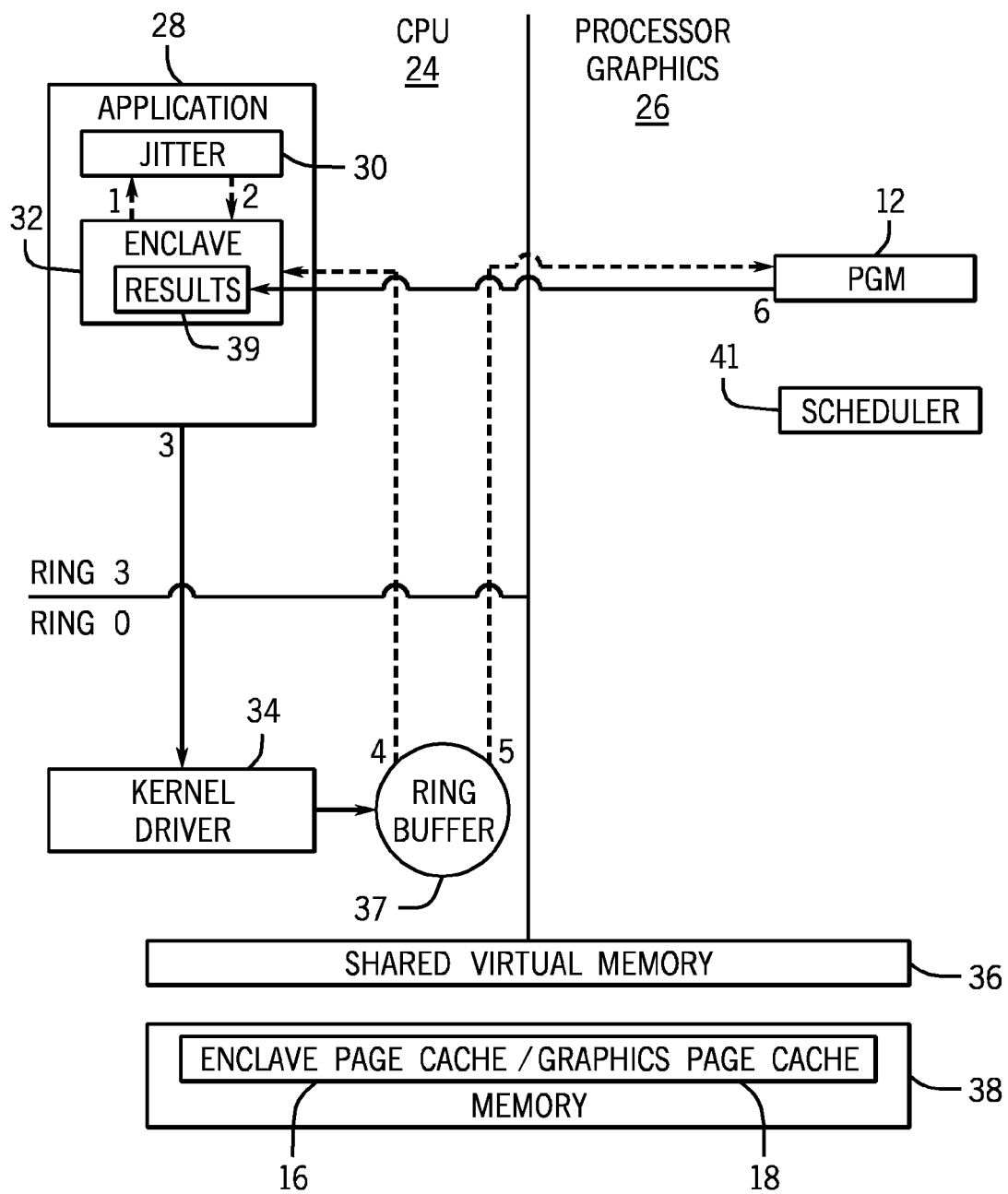
FIG. 2 is a diagram of the life cycle of a protected graphics module in accordance with one embodiment.

The processing graphics 26, shown in FIG. 2, includes the protected graphics module 12 while the application 28 is resident within the CPU 24. The CPU 24 may include a just in time execution engine (jitter) 30 and the enclave 32. It may also support a kernel driver 34. Shared virtual memory 36 may be shared between the central processing unit 24 and the processing graphics 26. Shared system memory 38 may store the enclave page cache 16 and graphics page cache 18.

Initially, the application 28 is launched on the CPU 24. This application is typically a ring three application launched in a process of its own. The application creates an enclave 32 and the enclave page cache 16. The enclave may contain metadata and metacode to create the protected graphics modules 12. The enclave also contains the jitter 30 for converting the module metacode from a high level language to the binary format that can be recognized by the processor and graphics hardware. The enclave also contains metadata and metacode to create the modules 12.

To create a module 12, the enclave loads metacode and metadata from the graphics workload and measures or verifies the workload using appropriate crypto operations. This is indicated by the arrows 1 and 2 in FIG. 2. Then the enclave sets up the processor graphics state and the data structures needed for the execution of the module 12 in the graphics page cache 18.

The invocation of the module proceeds as follows. The enclave requests through the application, that the kernel mode graphics driver 34 execute the module by providing it to relevant metadata. This is indicated by the arrow 3 in FIG. 2. The kernel mode graphics driver 34 (ring zero) takes the metadata and sets up the graphics engine state as per the metadata (arrow 4). The kernel graphics driver then points the processing graphics to the entry point of the module 12 via ring buffer 37 as indicated by the arrow 5. The kernel mode graphics driver maps the graphics page cache into the graphics address space by appropriately modifying the shared virtual memory 36 tables.

The processing graphics 26 executes the module 12 as indicated by the arrow 6. The graphics scheduler 41, within the processing graphics 26, informs the driver 34, which then closes the access to the graphics page cache provided for execution of the module 12. When the module 12 is scheduled for execution again, the graphics driver provides the graphics page cache access to the module and the module is executed. After the module completes its execution, it writes its results 39 of the execution to the output address inside the graphics page cache as indicated by the arrow 6. As specified in the metadata during the creation of the module 12, the fronting enclave subsequently reads the output and provides it to the central processing unit code executing inside the enclave.

In accordance with one embodiment, the module 12 may have a well-defined format memory and the format is used to measure the unique components of the module and bind them to the results. The microcode measures the module at the time of execution by the enclave and provides a cryptographically signed measurement to the enclave. The enclave includes the measurement of the module and the measurement of the enclave and the combined data is used for attestation using the enclave attestation protocol.

In another embodiment, the module has an arbitrary format and is only understood by a loader inside the enclave. The enclave uses public key cryptography to verify the source of the module blob. The fact that the enclave enforces publicly verification is implicitly attested to by the enclave's measurement.

Even though the embodiment above pertains to processing graphics, these procedures can be applied to any coprocessor/accelerator/device including crypto accelerators integrated on the same chip as the central processing unit.

Figure 3:
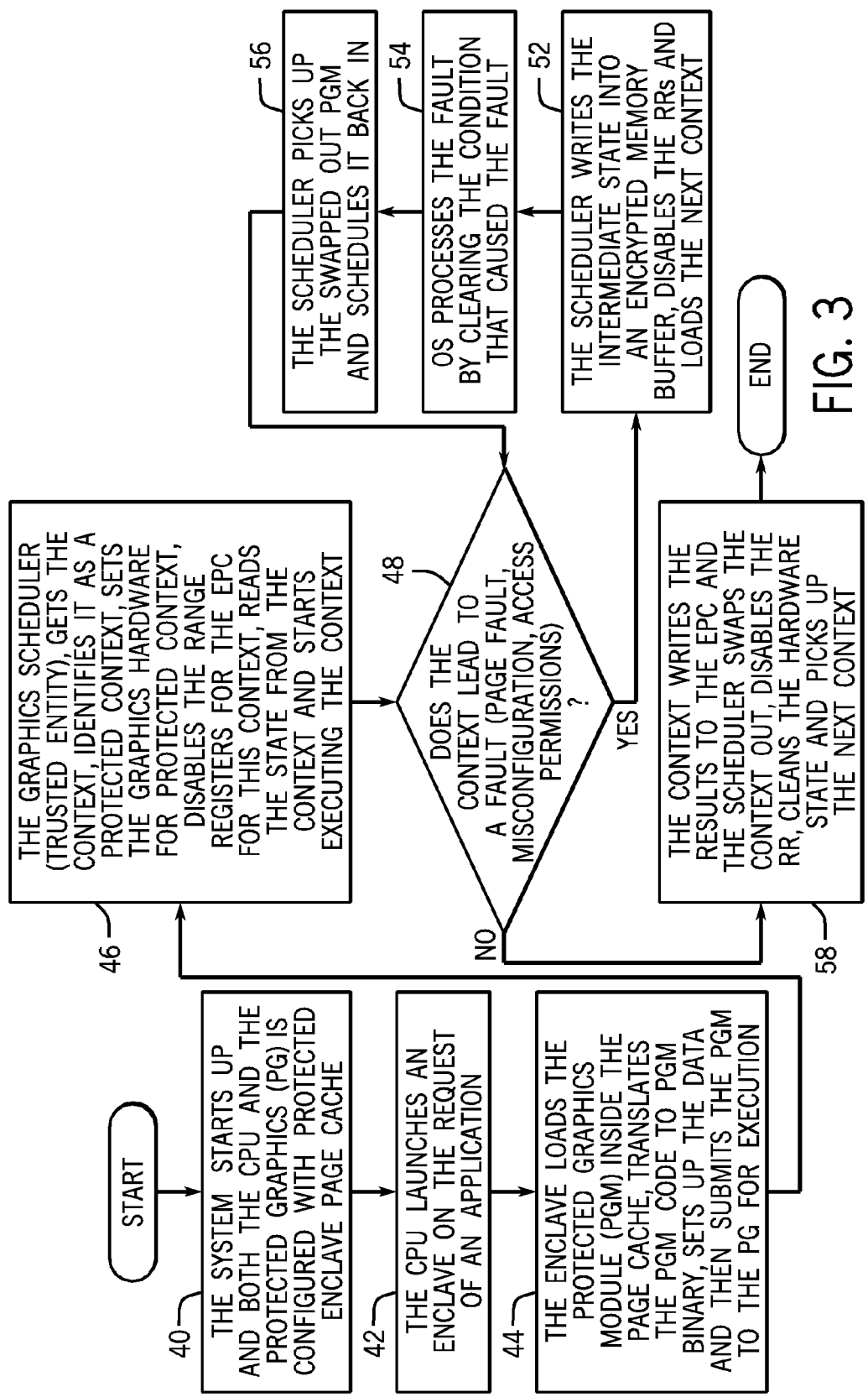
FIG. 3 is a flow chart for one embodiment of the present invention.

Referring next to FIG. 3, a sequence depicted there may be implemented in software, firmware and/or hardware. In software and firmware embodiments it may be implemented by computer executed instructions stored in one or more non-transitory computer readable media such as magnetic, optical or semiconductor storages.

The sequence begins at block 40 when the system starts up and both the central processing unit and the protected graphics are configured with a protected enclave page cache. Then, in block 42, the central processing unit launches a enclave on the request of an application. The enclave may be protected from any untrusted CPU or protected graphics code by the hardware in the processor. Then, as shown in block 44, the enclave loads protected graphics module inside the page cache, translates the module code to module binary, sets up the data and then submits the module to the processing graphics for execution.

The graphics scheduler or command streamer 41, which is a trusted entity, gets a context, identifies it as protected context, sets the graphics hardware for protected context, disables the range registers for the enclave page cache for this context, reads the state from the context and starts executing the context as indicated in block 46. Then at diamond 48 a check determines whether the context leads to a fault such as page fault, misconfiguration, or access permissions. If so, the scheduler writes the intermediate state into an encrypted memory buffer, disables the range registers, and loads the next context as indicated in block 52. Then the operating system processes the fault by clearing the condition that caused the fault as indicated in block 54. The scheduler picks up the swapped out protected graphics module and schedules it back in as indicated in block 56. Then the flow returns back to the check at diamond 48.

If the context does not lead to a fault, then the context writes the result to the enclave page cache and the schedule swaps the context out, disables a range register, and cleans the hardware state and picks up the next context as indicated in block 58. The workload might decide to send its results to the display engine.

The scheduler that schedules the protected graphics mode module may be trusted by the protected graphics module and may enjoy the same protections as the protected graphics module or it cannot read and write the protected graphics module but schedules it like a black box. The scheduler may be a software scheduler or a hardware scheduler or a combination of both. The enclave infrastructure may be one embodiment for trusted creation or execution of the protected graphics modules. The protected graphics modules can also be created in a trusted cloud environment and then executed on a client. While the preceding discussion emphasizes a graphics device, however, in other embodiments any device that has computation capabilities that can be used as an offload device for computation or for security may benefit from the principles described herein. The modules may be provisioned with secrets after module distribution to customers.

Figure 4:
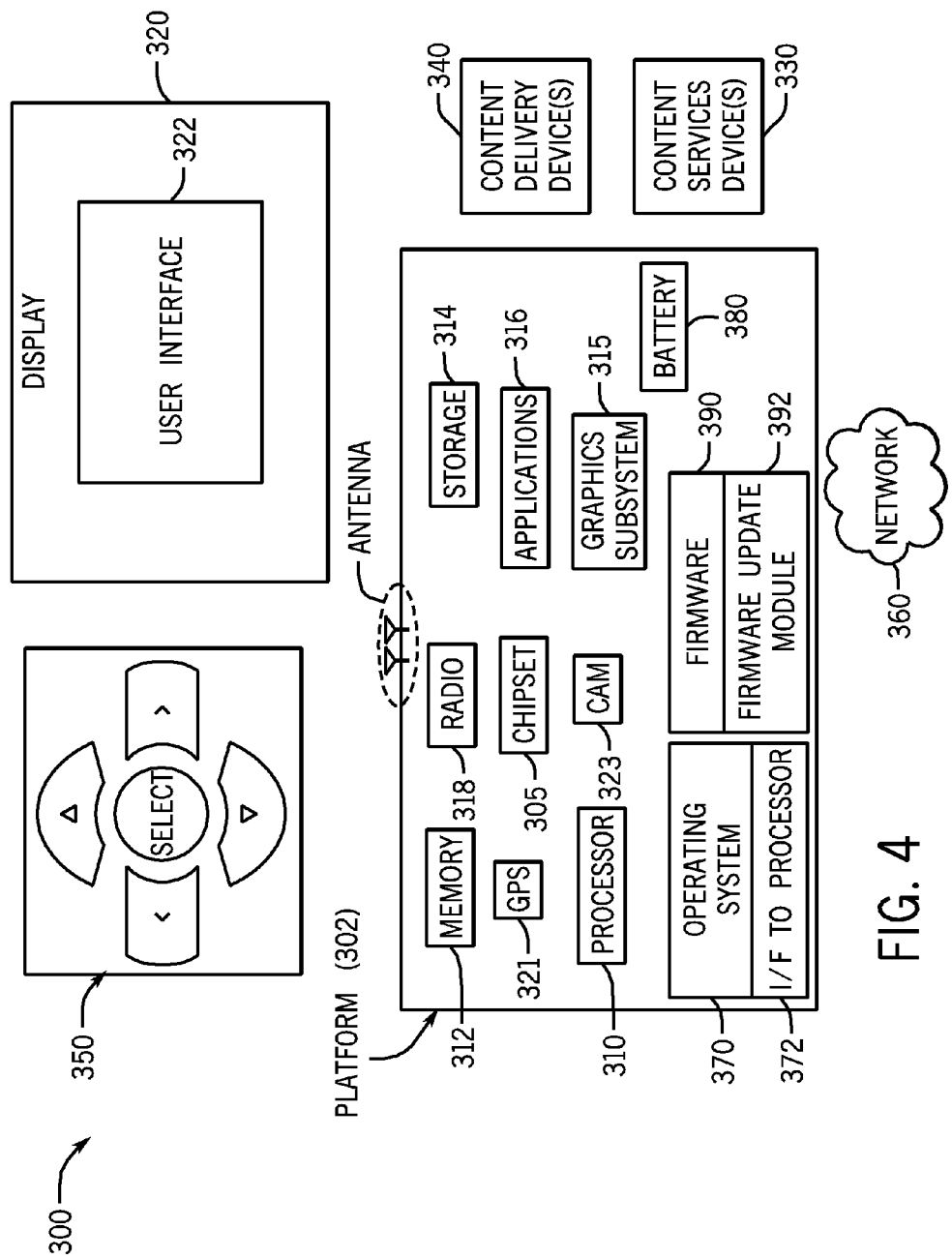
FIG. 4 is a system depiction for one embodiment.

FIG. 4 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
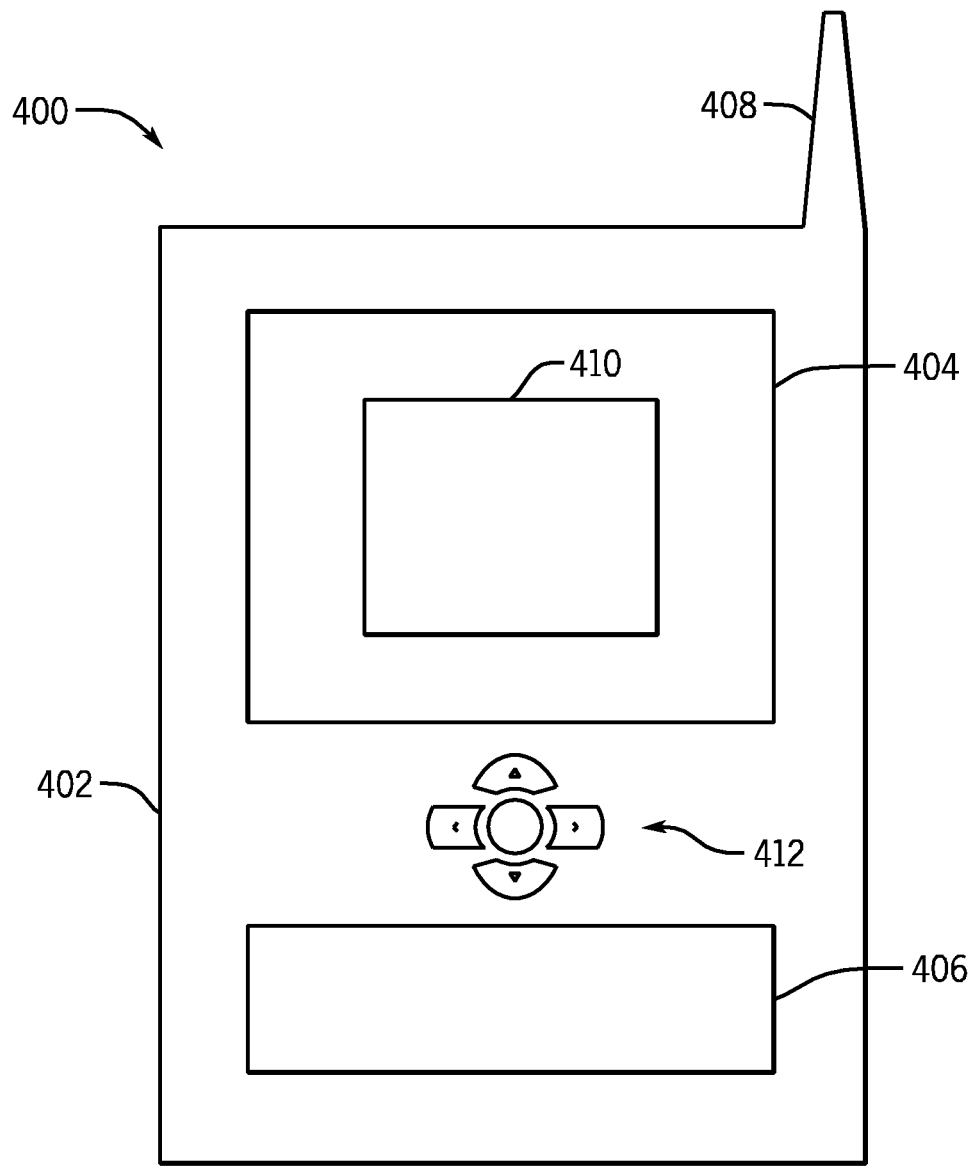
FIG. 5 is a front elevational view of one embodiment.

As described above, system 300 may be embodied in varying physical styles or form factors. FIG. 5 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIGS. 1 and 2 in software and/or firmware embodiments. Particularly the sequences may be implemented by one or more non-transitory storage devices storing computer implemented instructions.

As shown in FIG. 5, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The graphics processing techniques described herein may be implemented in various hardware architectures. For example, graphics functionality may be integrated within a chipset. Alternatively, a discrete processing graphics may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   creating a trusted framework for a processing graphics unit on a central processing unit using a first operating system by providing an enclave on the central processing unit to build a protected module on the processing graphics unit;
   using a driver on the processing graphics unit to point the processing graphics unit to an entry point of the protected module;
   executing said protected module on said processing graphics unit;
   measuring code and data structures used to execute a workload running on the processing graphics unit:
   determining whether a part of the processing graphics unit is compromised using measured code and data structures;
   patching the compromised part remotely; and
   proving the patching remotely through attestation.

2. The method of claim 1 including enabling the enclave to communicate with the module via a cache in memory shared between said central processing unit and said processing graphics unit.

3. The method of claim 2 including storing code and data used by said module in said cache.

4. The method of claim 3 including creating said cache in memory inaccessible by the first operating system on said central processing unit.

5. The method of claim 1 including executing an application on said central processing unit to launch said enclave.

6. The method of claim 5 including using said enclave to convert module code to binary code.

7. The method of claim 1 including verifying the workload in said enclave and loading code and data from said workload to create said module.

8. The method of claim 1 including causing an untrusted kernel driver to execute enclave supplied code to invoke said module.

9. The method of claim 1 including causing the module to write execution results to said enclave.

10. The method of claim 1 including asserting correctness of the module to a remote party.

11. The method of claim 1 including provisioning the module with secrets after distribution.

12. The method of claim 1 including protecting the enclave from an untrusted central processing unit.

13. One or more non-transitory computer readable media storing instructions executed by a central processing unit to perform a sequence comprising:
   creating a trusted framework for a processing graphics unit on the central processing unit by providing an enclave on the central processing unit to build a protected module on the processing graphics unit;
   using a driver on the processing graphics unit to point the processing graphics unit to an entry point of the protected module;
   executing said protected module on said processing graphics unit;
   measuring code and data structures used to execute a workload running on the processing graphics unit;
   determining whether a part of the processing graphics unit is compromised using measured code and data structures;
   patching the compromised part remotely; and
   proving the patching remotely through attestation.

14. The media of claim 13 further storing instructions to perform a sequence including enabling the enclave to communicate with the module via a cache in memory shared between said central processing unit and said processing graphics unit.

15. The media of claim 14 further storing instructions to perform a sequence including storing code and data used by said module in said cache.

16. The media of claim 15 further storing instructions to perform a sequence including creating said cache in memory inaccessible by an operating system on said central processing unit.

17. The media of claim 13 further storing instructions to perform a sequence including verifying the workload in said enclave and loading code and data from said workload to create said module.

18. The media of claim 13 further storing instructions to perform a sequence including causing an untrusted kernel driver to execute enclave supplied code to invoke said module.

19. The media of claim 13 further storing instructions to perform a sequence including causing the module to write execution results to said enclave.

20. The media of claim 13 further storing instructions to perform a sequence including asserting correctness of the module to a remote party.

21. The media of claim 13 further storing instructions to perform a sequence including provisioning the module with secrets after distribution.

22. The media of claim 13 further storing instructions to perform a sequence including protecting the enclave from an untrusted central processing unit.

23. A computer comprising:
   a processing graphics unit; and
   a central processing unit coupled to said processing graphics unit using a first operating system to provide an enclave to build a protected module on the processing graphics unit using a trusted framework on the processing graphic unit,
      using a driver on the central processing unit to point the processing graphics unit to an entry point of the protected module,
      to execute said protected module on said processing graphics unit,
      to measure code and data structures used to execute a workload running on the processing graphics unit,
      to determine whether a part of the processing graphics unit is compromised using measured code and data structures,
      to patch the compromised part remotely; and prove the patching remotely through attestation.

24. The computer of claim 23 including a memory with a cache, said memory shared between processing graphics and central processing units, said enclave to communicate with the module via the cache.

25. The computer of claim 23 including a battery.

26. The computer of claim 23 including firmware and a module to update said firmware.

* * * * *